(12) United States Patent
Tokorozawa

(10) Patent No.: US 10,843,523 B2
(45) Date of Patent: Nov. 24, 2020

(54) VEHICLE AIR CONDITIONER

(71) Applicant: DENSO CORPORATION, Kariya (JP)

(72) Inventor: Keisuke Tokorozawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 135 days.

(21) Appl. No.: 15/999,647

(22) PCT Filed: Jan. 19, 2017

(86) PCT No.: PCT/JP2017/001774
§ 371 (c)(1),
(2) Date: Aug. 20, 2018

(87) PCT Pub. No.: WO2017/145596
PCT Pub. Date: Aug. 31, 2017

(65) Prior Publication Data
US 2020/0055369 A1   Feb. 20, 2020

(30) Foreign Application Priority Data
Feb. 22, 2016 (JP) .................... 2016-031366

(51) Int. Cl.
*B60H 1/00* (2006.01)
*B60H 1/32* (2006.01)

(52) U.S. Cl.
CPC ....... *B60H 1/00571* (2013.01); *B60H 1/3223* (2013.01); *B60H 1/3233* (2013.01); *B60H 2001/3291* (2013.01)

(58) Field of Classification Search
CPC   B60H 1/00571; B60H 1/3223; B60H 1/3233; B60H 1/00; B60H 2001/3291
USPC ............................................... 62/239
See application file for complete search history.

(56) References Cited

FOREIGN PATENT DOCUMENTS

| JP | 2002301927 A | * | 10/2002 | |
|---|---|---|---|---|
| JP | 2007050864 A | * | 3/2007 | ......... B60H 1/00514 |
| JP | 2015066987 A | | 4/2015 | |

* cited by examiner

*Primary Examiner* — Ana M Vazquez
(74) *Attorney, Agent, or Firm* — Harness, Dickey & Pierce, P.L.C.

(57) ABSTRACT

A vehicle air conditioner includes an air-conditioning case having a drain hole through which an air passage communicates with an outside of a vehicle compartment, a heat exchanger disposed inside the air passage, and a seal member. The seal member is held between a dash panel and a seal wall of the air-conditioning case. The seal member has a through hole, and closes a through hole of the dash panel. The vehicle air conditioner includes a refrigerant pipe and a pressure reducing valve. The first case part and the second case part are fitted with each other in a fitting part below which, in the vertical direction, the air-conditioning case has a communication hole through which an outside of the air-conditioning case communicates with the air passage.

12 Claims, 10 Drawing Sheets

VEHICLE AIR CONDITIONER

CROSS REFERENCE TO RELATED APPLICATIONS

This application is a U.S. National Phase Application under 35 U.S.C. 371 of International Application No. PCT/JP2017/001774 filed on Jan. 19, 2017 and published in Japanese as WO/2017/145596 A1 on Aug. 31, 2017. This application is based on and claims the benefit of priority from Japanese Patent Application No. 2016-031366 filed on Feb. 22, 2016. The entire disclosures of all of the above applications are incorporated herein by reference.

TECHNICAL FIELD

The present disclosure relates to a vehicle air conditioner.

BACKGROUND ART

There is a conventional vehicle air conditioner including an air-conditioning case that includes an upper case having a recess and a lower case having a projection, the recess and the projection being fitted with each other, and a seal member that is disposed between the air-conditioning case and a dash panel in a manner to close a through hole of the dash panel (e.g., refer to Patent Literature 1).

The dash panel is a partition wall that separates an engine room on the front side of the vehicle and the inside of a vehicle compartment from each other. A refrigerant pipe passes through the through hole of the dash panel and a through hole of the seal member. That refrigerant pipe connects a cooling heat exchanger inside the air-conditioning case and a compressor inside the engine room to each other. A pressure reducing valve is disposed inside the through hole of the seal member. The pressure reducing valve is disposed on the middle of the refrigerant pipe and reduces the pressure of a refrigerant that is discharged from a discharge port of the compressor and flows to a refrigerant inlet of the cooling heat exchanger.

A water passage is formed between the bottom of the recess of the upper case and the edge of the projection of the lower case in the air-conditioning case. The water passage allows the outside of the air-conditioning case and the inside of an air passage to communicate with each other. Further, a water passage space is formed between an inlet port of the water passage and the seal member. The water passage space functions as a water collecting part which collects water, which has entered the inside of the vehicle compartment from the engine room through the through hole of the dash panel and the through hole of the seal member, and guides the collected water to the inlet port of the water passage.

Accordingly, water passing through the through hole of the dash panel and the through hole of the seal member from the engine room can be discharged to the outside of the vehicle compartment through the water passage space, the water passage, the air passage inside the air-conditioning case, and a drain hole.

PRIOR ART LITERATURE

Patent Literature

Patent Literature 1: JP 2015-066987 A

SUMMARY

However, according to a study of the inventor, the configuration as described above may require an extra member providing the water passage space in the air-conditioning case and may result in increase of a body size.

It is an object of the present disclosure to provide a vehicle air conditioner that discharges water, which has entered a vehicle compartment from an engine room through a through hole of a dash panel, to an outside of the vehicle compartment without providing a water passage space.

The present disclosure has been made by focusing on the fact that water that enters through a through hole of a dash panel and a through hole of a seal member from an engine room flows along a fitting part of an air-conditioning case.

According to an aspect of the present disclosure, a vehicle air conditioner mounted on a vehicle includes: an air-conditioning case disposed inside a vehicle compartment and including a first case part and a second case part that are fitted with each other, the air-conditioning case defining an air passage configured to allow an air flow to pass therethrough toward a seat in the vehicle compartment, and a drain hole through which the air passage communicates with an outside of the vehicle compartment; a heat exchanger disposed inside the air passage and configured to perform heat exchange between the air flow and refrigerant; a seal member held between a dash panel and a seal wall, the dash panel separating the vehicle compartment and an engine room that is located frontward of the vehicle compartment in the vehicle in a vehicle traveling direction, the seal wall being a wall of the air-conditioning case on a front side of the air-conditioning case in the vehicle traveling direction, the seal member having a through hole and disposed to close a through hole of the dash panel; a refrigerant pipe connecting the heat exchanger to a compressor inside the engine room in a state where the refrigerant pipe extends through an opening provided on the seal wall, the through hole of the seal member and the through hole of the dash panel, the refrigerant pipe constituting a refrigeration cycle that circulates the refrigerant between the heat exchanger and the compressor; and a pressure reducing valve disposed inside the through hole of the seal member and disposed between a refrigerant discharge port of the compressor and a refrigerant inlet of the heat exchanger, the pressure reducing valve being configured to reduce a pressure of the refrigerant that is discharged from the refrigerant discharge port of the compressor and flows toward the refrigerant inlet of the heat exchanger. The first case part and the second case part are fitted with each other in a fitting part below which, in a vertical direction, the air-conditioning case has a communication hole through which an outside of the air-conditioning case communicates with the air passage. The air-conditioning case is configured to allow water, which has passed through the through hole of the dash panel and the through hole of the seal member from the engine room, to flow along the fitting part and pass through the communication hole, the air passage and the drain hole, and then to be discharged to the outside of the vehicle compartment.

According to the above configuration, it is possible to provide the vehicle air conditioner that discharges water, which has entered the inside of the vehicle compartment from the engine room through the through hole of the dash panel, to the outside of the vehicle compartment without providing a water passage space.

DESCRIPTION OF EMBODIMENTS

Hereinafter, an embodiment of a vehicle air conditioner of the present disclosure will be described with reference to the drawings.

As illustrated in FIGS. 1, 2, 3, 4, and 5, a vehicle air conditioner 5 of the present embodiment includes an indoor air-conditioning unit 10 and a blower unit (not illustrated).

The indoor air-conditioning unit 10 is disposed on the central side in a lower part of an instrument panel in a vehicle compartment. That is, the indoor air-conditioning unit 10 is disposed on the front side in a vehicle traveling direction in the vehicle compartment and on the rear side in the vehicle traveling direction with respect to a dash panel 1.

The indoor air-conditioning unit 10 includes an air-conditioning case 11 which includes an air passage that causes an air flow blown from the blower unit (not illustrated) to pass toward seats in the vehicle compartment.

The blower unit is offset toward a passenger seat with respect to the indoor air-conditioning unit 10. The blower unit includes an inside and outside air switching introduction box and an electric blower. The blower unit introduces at least either inside air (that is, air inside the vehicle compartment) or outside air (that is, air outside the vehicle compartment) and blows the introduced air to the indoor air-conditioning unit 10.

Figure 1:
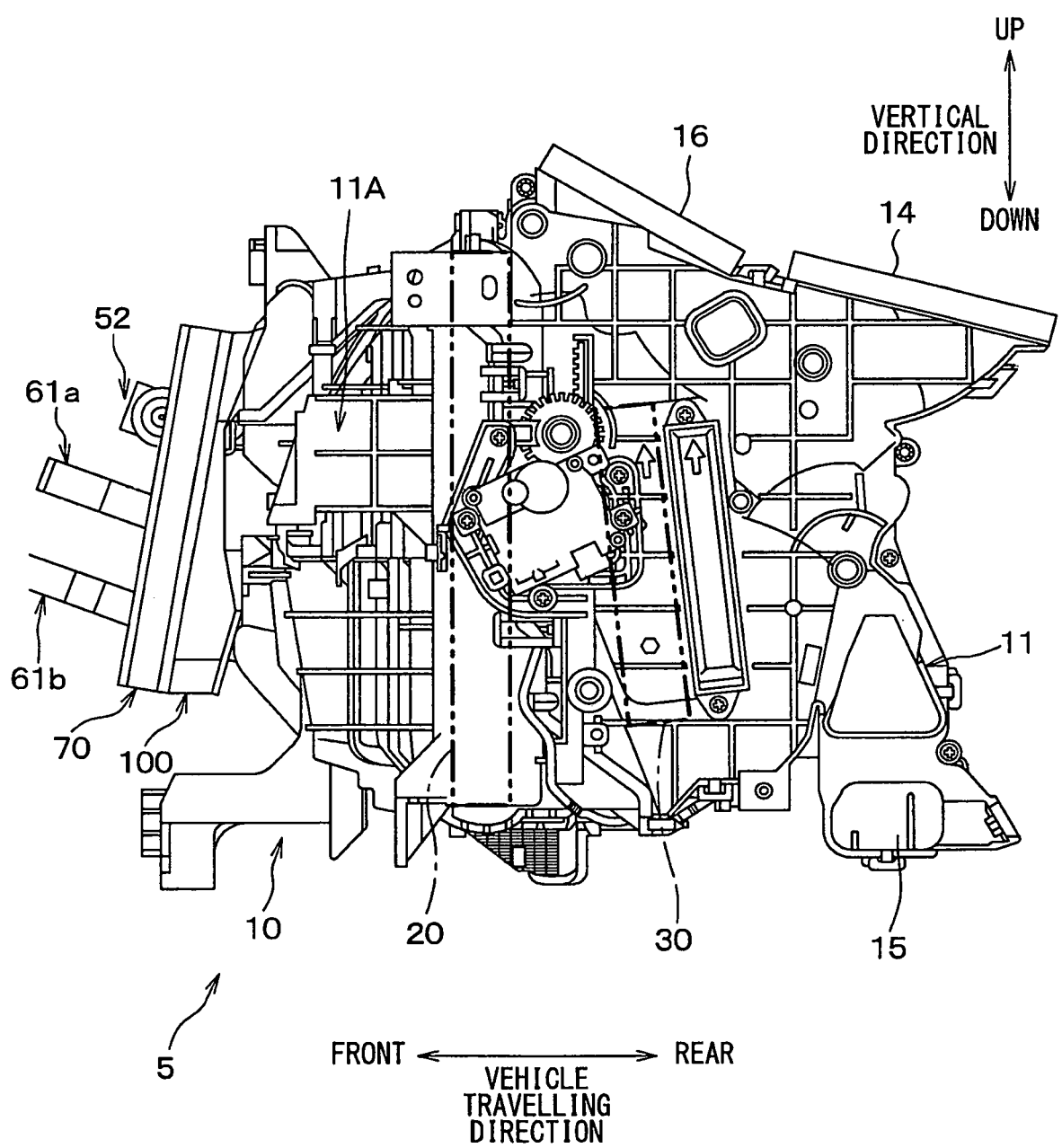
FIG. 1 is a left side view of a vehicle air conditioner.
Figure 2:
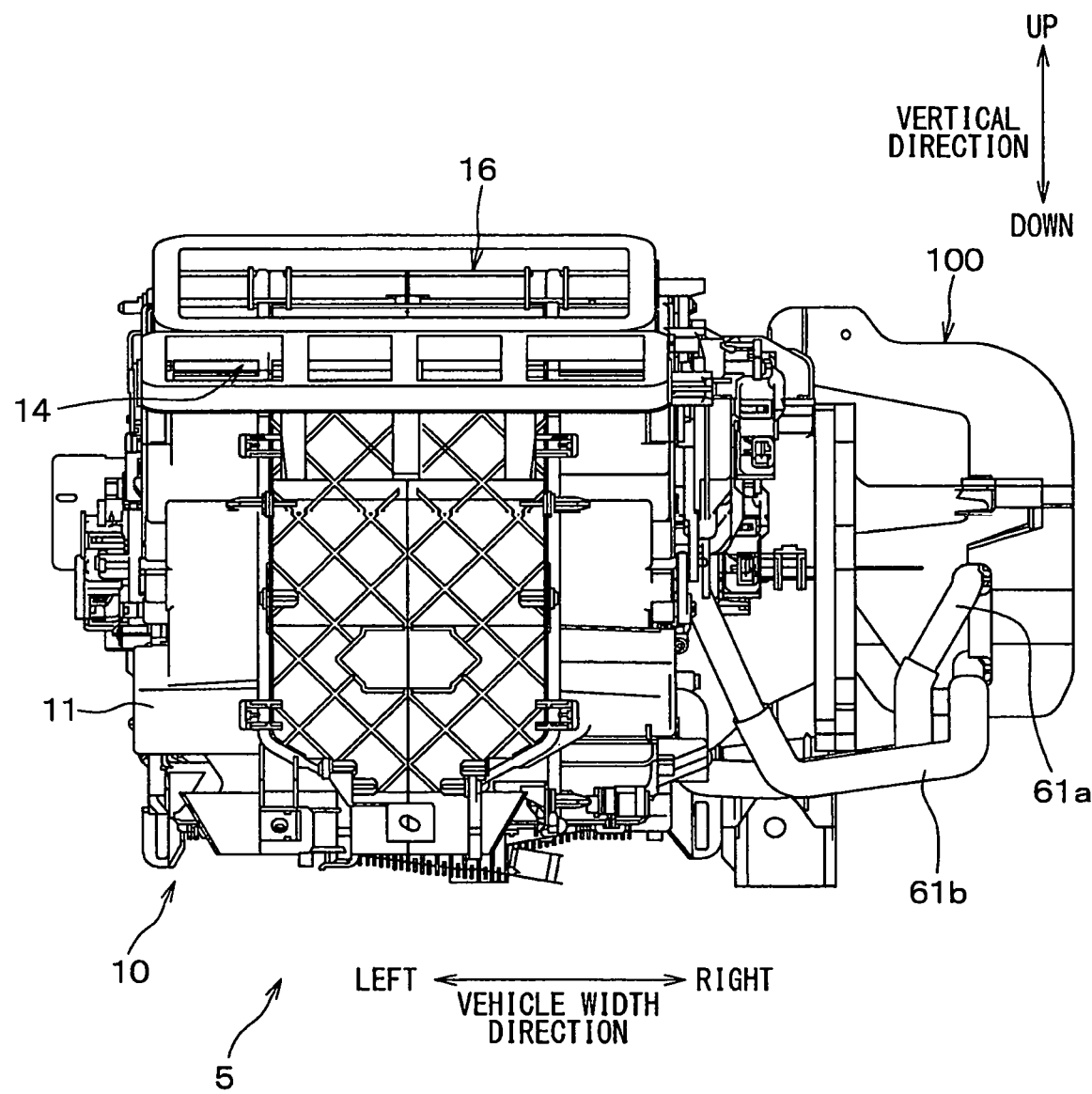
FIG. 2 is a front view of the vehicle air conditioner.
Figure 4:
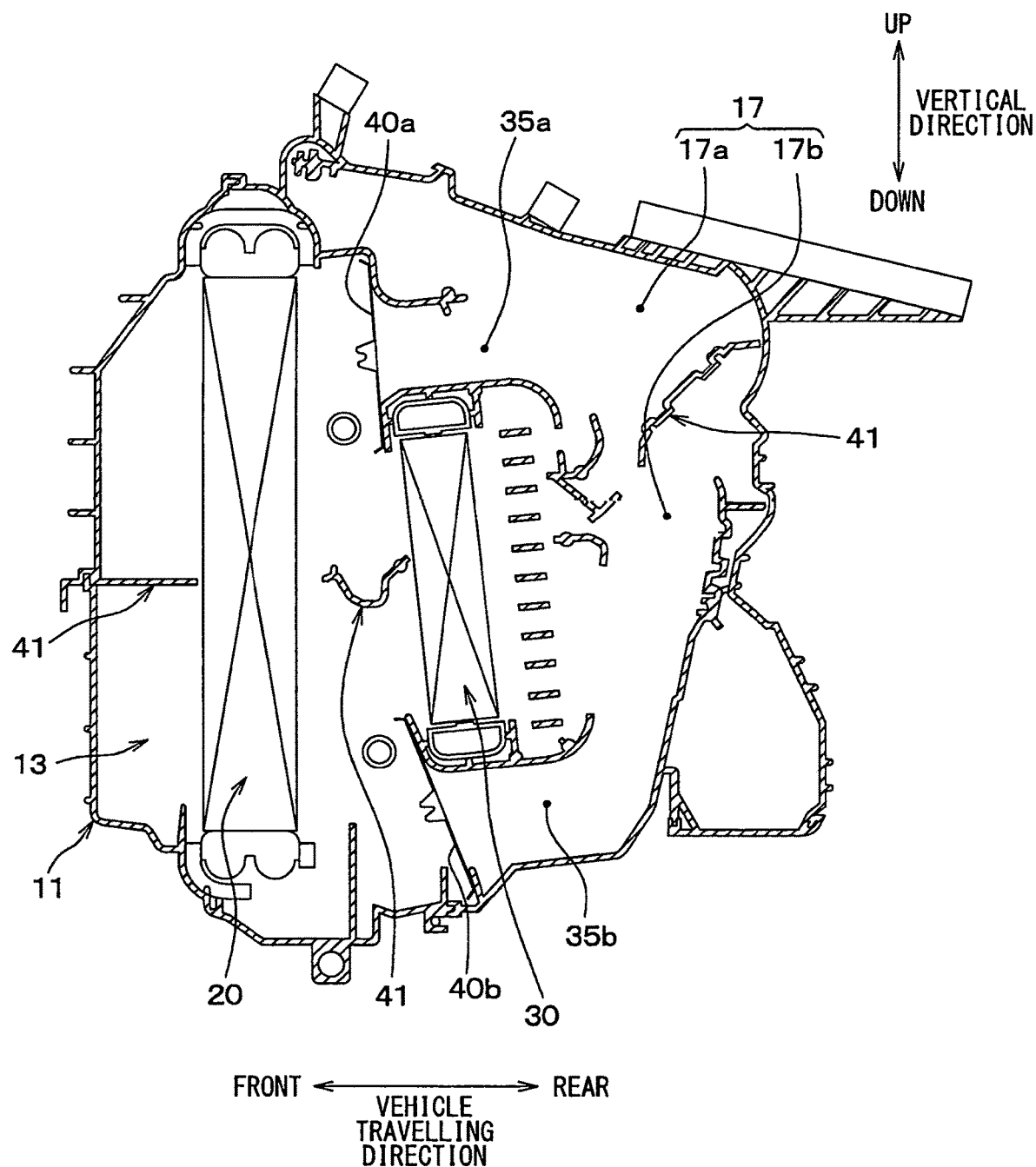
FIG. 4 is a sectional view of the vehicle air conditioner.
Figure 5:
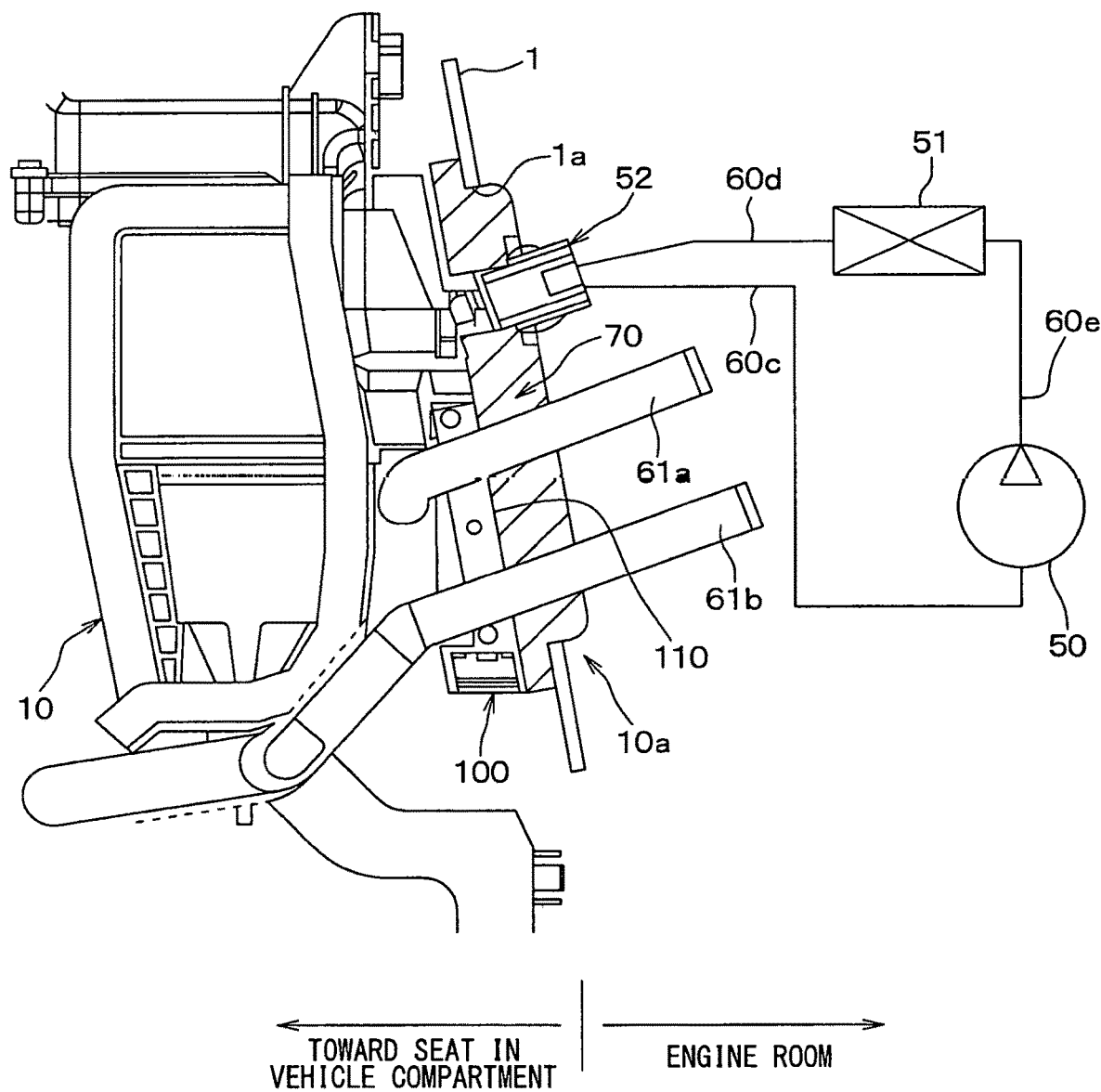
FIG. 5 is a sectional view of the vehicle air conditioner and a diagram illustrating the configuration of a refrigeration cycle.

As illustrated in FIGS. 1, 2, and 4, the air-conditioning case 11 includes a suction port 13, a face opening 14, a foot opening 15, a defroster opening 16, and an air passage 17.

The suction port 13 is located on the upstream side in the air flow with respect to a cooling heat exchanger 20 in the air-conditioning case 11. The blower unit is connected to the suction port 13. An air flow blown from the blower unit is sucked into the suction port 13.

The face opening 14 is an opening for guiding air-conditioning air to a face blowing port. The face blowing port is a blowing port for blowing air-conditioning air to the upper body of an occupant in the vehicle compartment. The foot opening 15 is an opening for guiding air-conditioning air to a foot blowing port. The foot blowing port is a blowing port for blowing air-conditioning air to the lower body of an occupant in the vehicle compartment. The defroster opening 16 is an opening for guiding air-conditioning air to a defroster blowing port. The defroster blowing port is a blowing port for blowing air-conditioning air to the inner surface of a windshield. The air passage 17 guides an air flow sucked through the suction port 13 to the openings 14, 15, 16.

Figure 6:
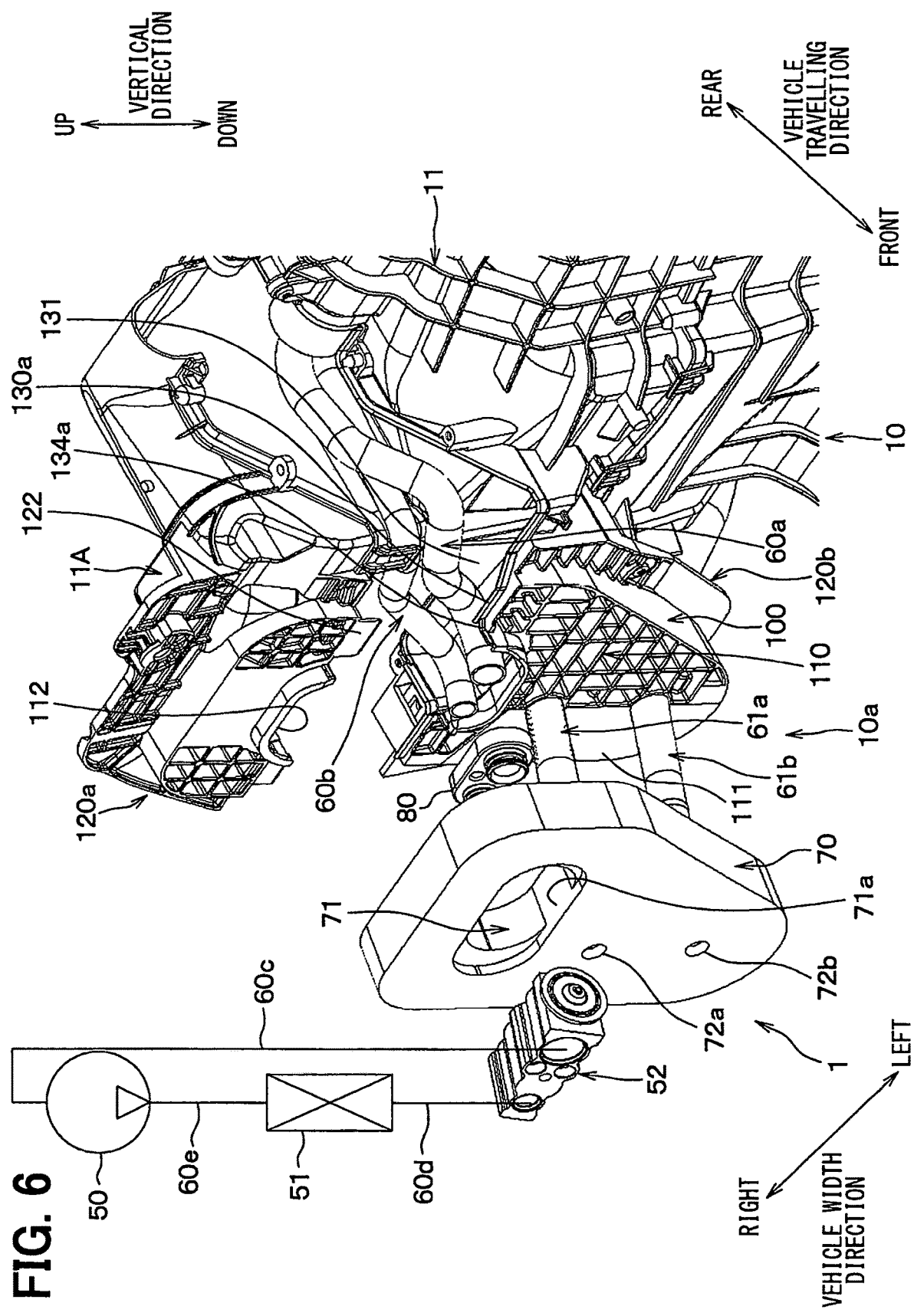
FIG. 6 is an exploded view illustrating a drain structure and a diagram illustrating the configuration of the refrigeration cycle.
Figure 7:
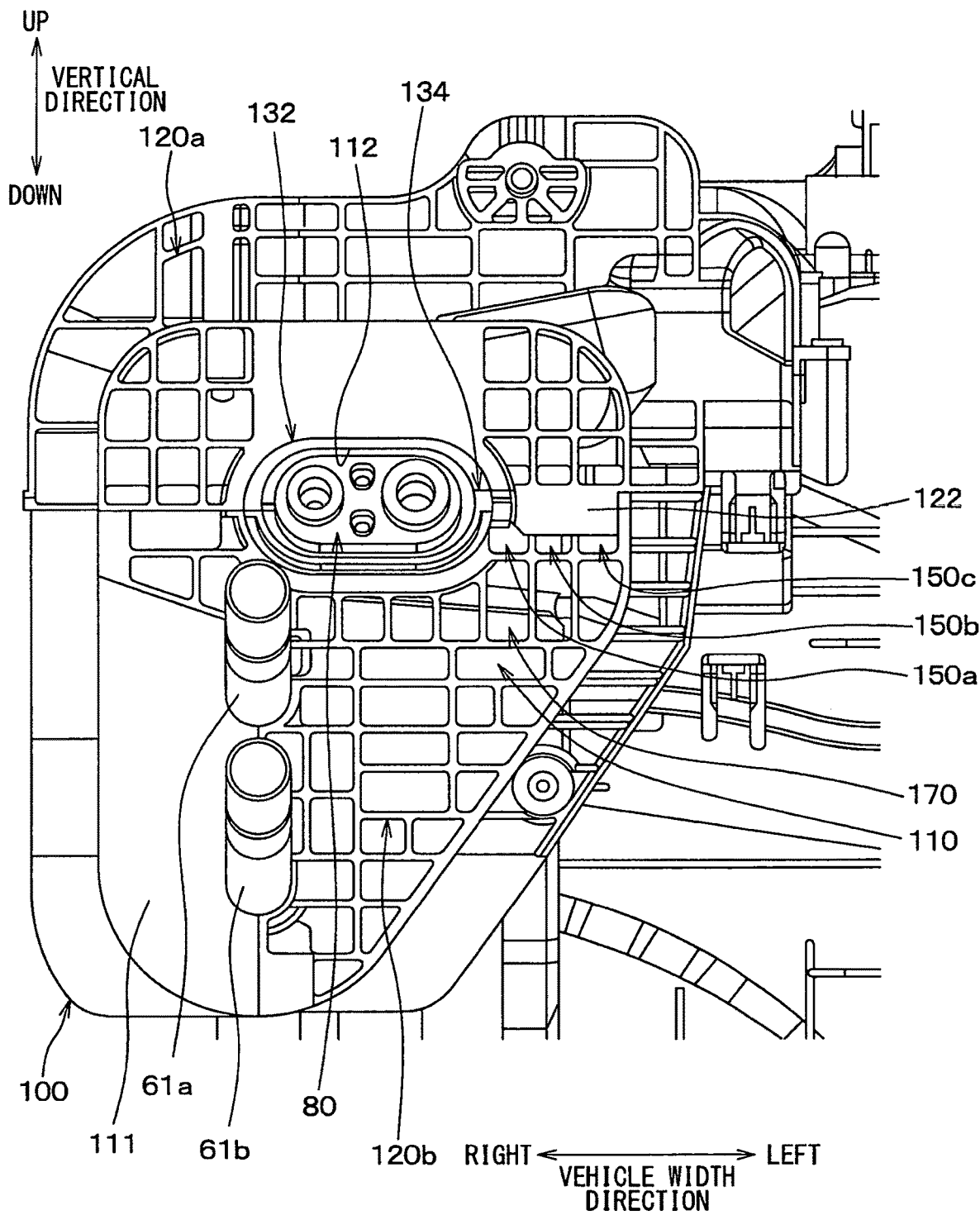
FIG. 7 is an enlarged view of a seal wall.

The cooling heat exchanger 20, a heating heat exchanger 30, and air mix doors 40a, 40b are disposed inside the air passage 17 of the air-conditioning case 11 of FIGS. 1 and 6.

The cooling heat exchanger 20 constitutes a refrigeration cycle that circulates a refrigerant together with a compressor 50, a condenser 51, and a pressure reducing valve 52.

The cooling heat exchanger 20 is a heat exchanger that cools an air flow introduced into the air passage 17 through the suction port 13 by a refrigerant which is pressure-reduced and expanded by the pressure reducing valve 52.

The compressor 50 is disposed inside an engine room. The compressor 50 sucks the refrigerant, and compresses and discharges the sucked refrigerant. The condenser 51 is an outside heat exchanger that is disposed inside the engine room and cools the refrigerant discharged from the compressor 50 by outside air. The pressure reducing valve 52 pressure-reduces and expands the refrigerant that has passed through the condenser 51.

The cooling heat exchanger 20, the compressor 50, the condenser 51, and the pressure reducing valve. 52 of the present embodiment constitute the refrigeration cycle through refrigerant pipes 60a, 60b, 60c, 60d, 60e.

The heating heat exchanger 30 is disposed on the downstream side in the air flow with respect to the cooling heat exchanger 20 and heats air that has passed through the cooling heat exchanger 20 by hot water which is an engine cooling water. The cooling heat exchanger 20 and the heating heat exchanger 30 are supported by the air-conditioning case 11. The engine cooling water circulates through hot water pipes 61a, 61b between the heating heat exchanger 30 and a traveling engine.

The hot water pipes 61a, 61b project from a seal wall 110 of a seal support part 100 of the air-conditioning case 11. The hot water pipes 61a, 61b respectively pass through a through hole 72a and a through hole 72b of a seal member 70 illustrated in FIG. 6. Thus, the hot water pipes 61a, 61b connect the heating heat exchanger 30 and the traveling engine to each other in a state in which the hot water pipes 61a, 61b pass through the through holes 71, 72a, 72b of the seal member 70 and a through hole 1a of the dash panel 1.

The refrigerant pipes 60a, 60b, 60c, 60d, 60e connect the cooling heat exchanger 20 and the compressor 50 to each other in a state in which the refrigerant pipes 60a, 60b, 60c, 60d, 60e pass through an opening 112 of the seal wall 110, the through hole 71 of the seal member 70, and the through hole 1a of the dash panel 1 to constitute the refrigeration cycle.

The seal support part 100 projects to the front side in the vehicle traveling direction from an air-conditioning case body 11A which constitutes the air passage 17 in the air-conditioning case 11. The seal support part 100 is disposed on the right side in a vehicle width direction of the air-conditioning case 11.

The seal wall 110 is formed on the front side in the vehicle traveling direction of the seal support part 100. The seal wall 110 supports the seal member 70 from the rear side in the vehicle traveling direction. Thus, the seal wall 110 is covered with the seal member 70 from the front side in the vehicle traveling direction.

The seal member 70 is held between the seal wall 110 and the dash panel 1. The seal member 70 is made of an elastically deformable material such as urethane and formed in a plate-like shape. The seal member 70 is disposed in such a manner that the seal member 70 covering the seal wall 110 from the front side in the vehicle traveling direction elastically deforms to close the through hole 1a of the dash panel 1. The seal member 70 of the present embodiment is caused to adhere to the seal wall 110.

The seal member 70 constitutes the through holes 71, 72a, 72b which penetrate the seal member 70 in the vehicle traveling direction. The through hole 71 extends in the vehicle width direction. The through hole 71 is disposed on the upper side in the vertical direction with respect to the through holes 72a, 72b. The refrigerant pipes 60a, 60b, 60c, 60d pass through the through hole 71.

The pressure reducing valve 52 and a tube connector 80 are disposed between the refrigerant pipes 60a, 60b and the refrigerant pipes 60c, 60d. The pressure reducing valve 52 and the tube connector 80 are disposed inside the through hole 71 of the seal member 70. The tube connector 80 is disposed between the pressure reducing valve 52 and the seal wall 110.

The refrigerant pipes 60a, 60c connect a refrigerant outlet of the cooling heat exchanger 20 and a refrigerant inlet of the compressor 50 to each other. The refrigerant pipe 60b connects a refrigerant inlet of the cooling heat exchanger 20 and a refrigerant outlet of the pressure reducing valve 52 to each other. The refrigerant pipe 60d connects a refrigerant inlet of the pressure reducing valve 52 and a refrigerant outlet of the condenser 51 to each other. The refrigerant pipe 60e connects a refrigerant outlet of the compressor 50 and a refrigerant inlet of the condenser 51 to each other.

The seal support part 100 and the seal member 70 of the present embodiment constitute a drain structure 10a which discharges water that enters the inside of the vehicle compartment from the engine room through the through hole 1a of the dash panel 1 to the outside of the vehicle compartment through the air passage 17 of the air-conditioning case 11. The structure of the drain structure 10a will be described later.

The air-conditioning case 11 of FIG. 4 is provided with bypass passages 35a, 35b which cause cool air flowing from the cooling heat exchanger 20 to flow to each blowing opening while bypassing the heating heat exchanger 30. The bypass passage 35a is disposed above the heating heat exchanger 30 in the air-conditioning case 11. The bypass passage 35b is disposed below the heating heat exchanger 30 in the air-conditioning case 11.

The air mix doors 40a, 40b are disposed between the heating heat exchanger 30 and the cooling heat exchanger 20. The air mix door 40a changes the ratio between the volume of air passing through the bypass passage 35a and the volume of air passing through the heating heat exchanger 30. The air mix door 40b changes the ratio between the volume of air passing through the bypass passage 35b and the volume of air passing through the heating heat exchanger 30. The temperature of air blown toward the seats in the vehicle compartment through the openings 14, 15, 16 can be changed by the air mix doors 40a, 40b which operate in this manner. The openings 14, 15, 16 collectively refer to the face opening 14, the foot opening 15, and the defroster opening 16.

The air-conditioning case 11 is provided with a partition wall 41 which partitions the air passage 17 into an upper air passage 17a and a lower air passage 17b. Mode doors which open and close the face opening 14, the foot opening 15, and the defroster opening 16 are disposed inside the air-conditioning case 11.

Figure 3:
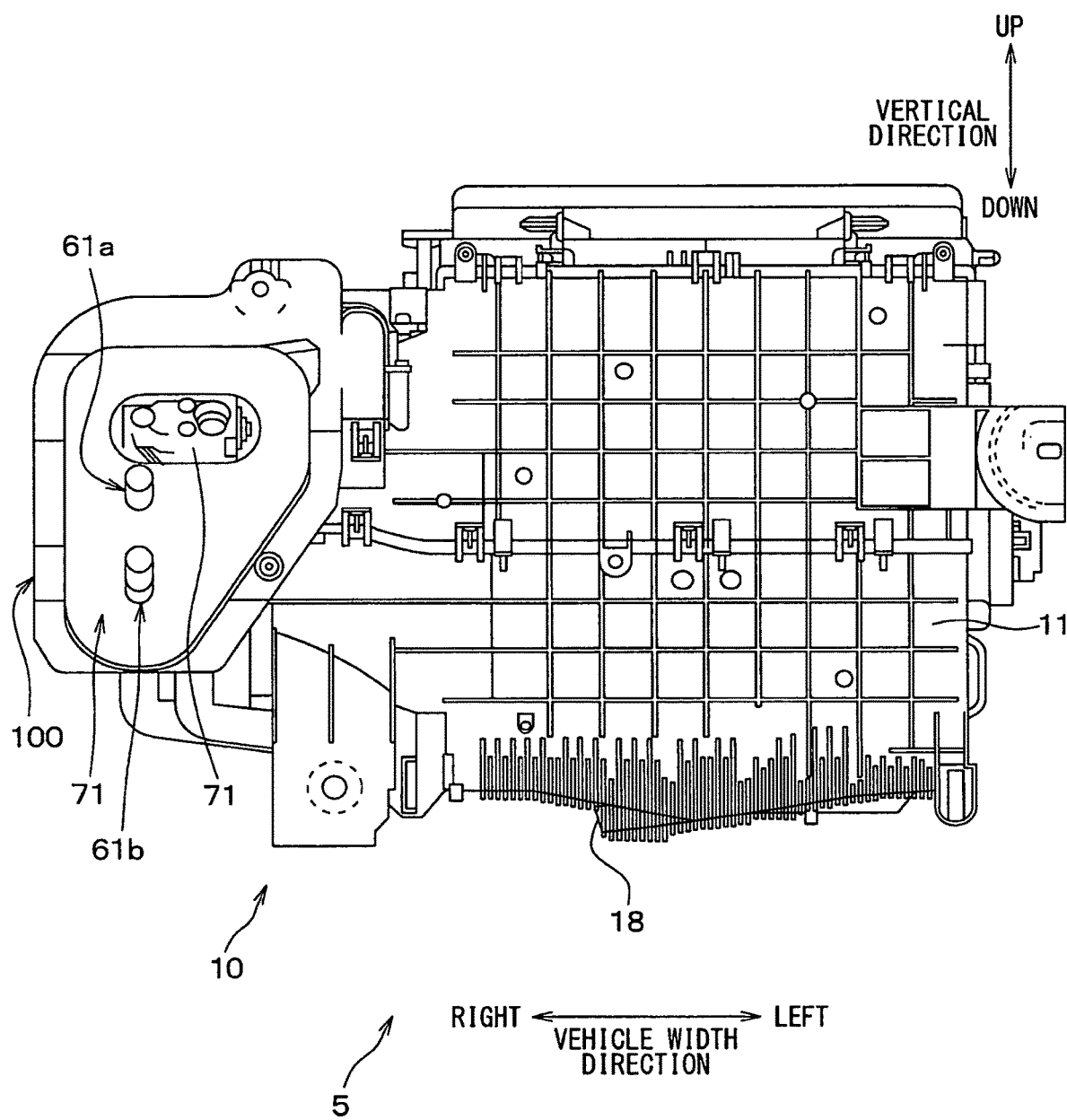
FIG. 3 is a rear view of the vehicle air conditioner.

As illustrated in FIG. 3, a drain hole 18 is formed on the air-conditioning case 11 on the lower side in the vertical direction with respect to the cooling heat exchanger 20. Condensed water generated in the cooling heat exchanger 20 and water that enters the inside of the vehicle compartment from the engine room are discharged to the outside of the vehicle compartment through the drain hole 18.

Next, the drain structure 10a of the present embodiment will be described.

As illustrated in FIGS. 7, 8, 9, 10, and 11, the seal support part 100 includes a fitting part 130 where a first case part 120a and a second case part 120b are fitted with each other. The fitting part 130 includes a recess of the first case part 120a and a projection 130a of the second case part 120b, the projection 130a being fitted with the recess. The first case part 120a is disposed on the upper side in the vertical direction with respect to the second case part 120b.

A recess 131a which is recessed to the upper side in the vertical direction is formed on the first case part 120a. A recess 131b which is recessed to the upper side in the vertical direction is formed on the second case part 120b. The recess 131a of the first case part 120a and the recess 131b of the second case part 120b are combined to constitute a' pipe storage part 131 illustrated in FIG. 11.

The pipe storage part 131 is formed between the seal wall 110 and the air passage 17 in the air-conditioning case 11. The pipe storage part 131 is a space that communicates with the opening 112 of the seal wall 110 and extends in the vertical direction. The opening 112 penetrates the seal wall 110 in the vehicle traveling direction. The refrigerant pipes 60a, 60b are stored in the pipe storage part 131 of the present embodiment on the upper side in the vertical direction thereof.

Figure 8:
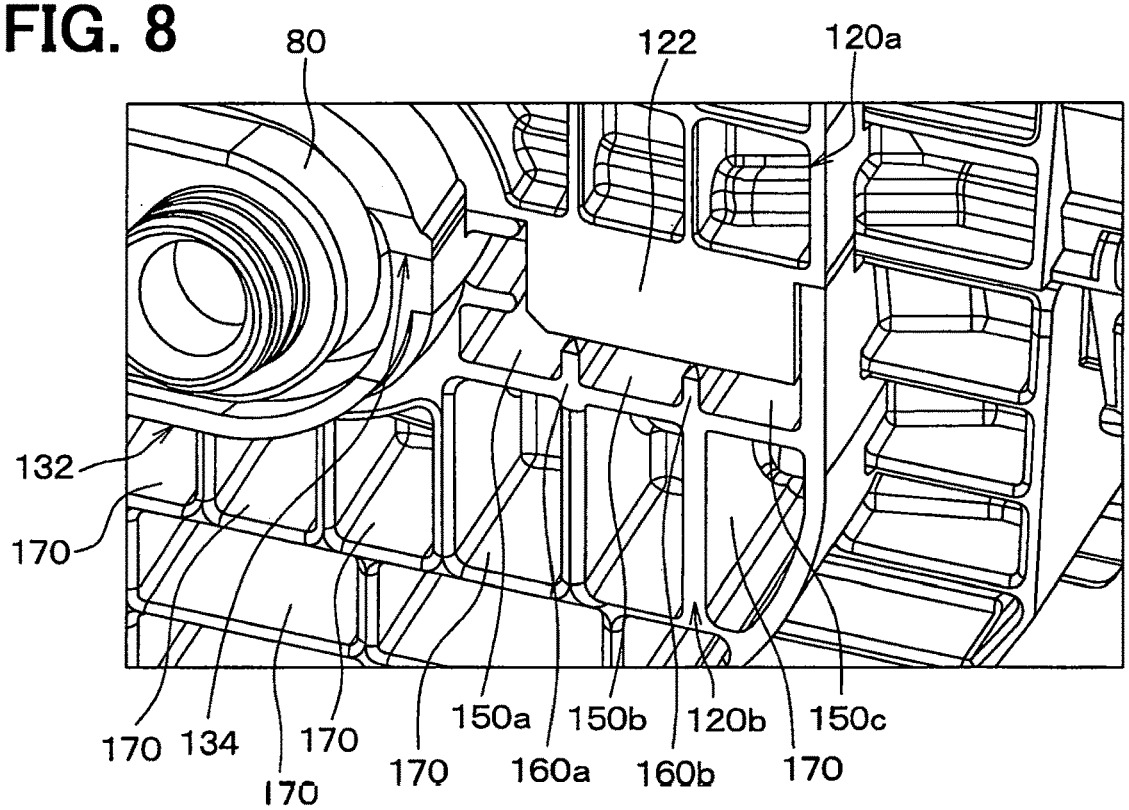
FIG. 8 is a partial enlarged view of the seal wall illustrating a state in which first and second case parts are fitted with each other.
Figure 9:
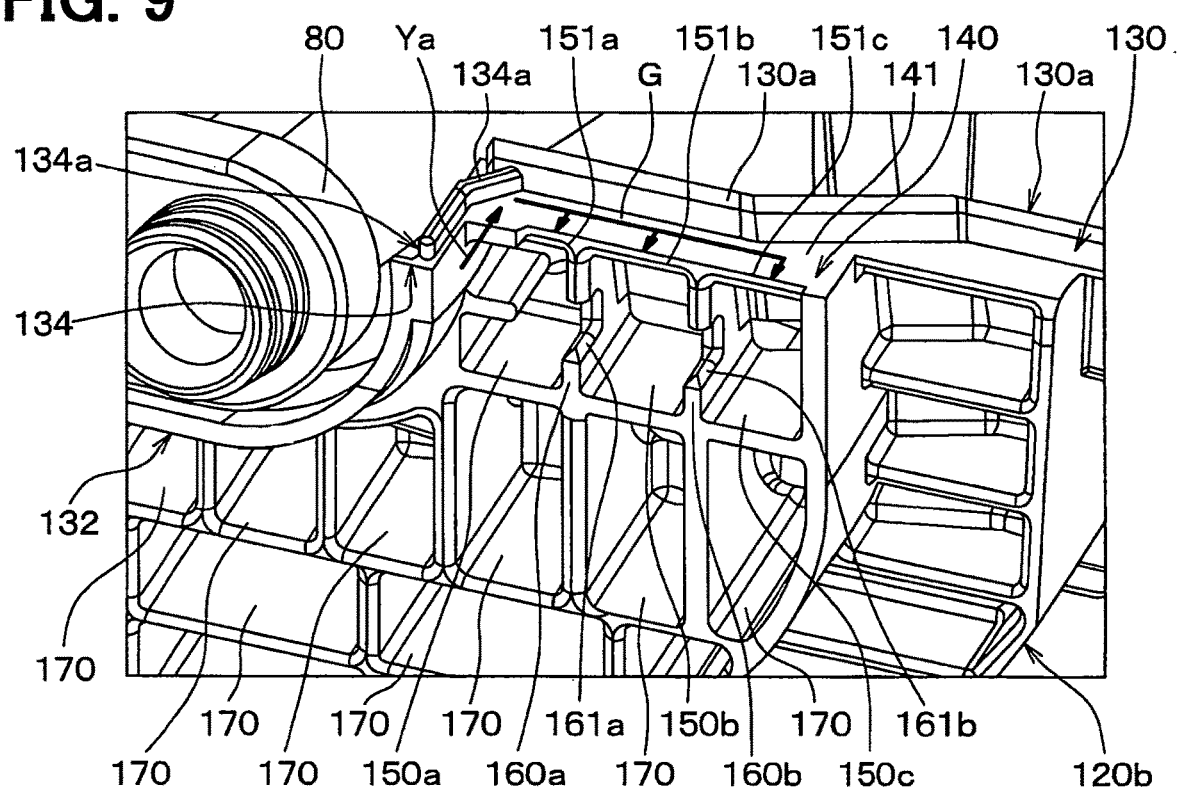
FIG. 9 is an enlarged view of the seal wall illustrating only the second case part.

As illustrated in FIGS. 8 and 9, an annular projection 132 is formed on the seal support part 100. The annular projection 132 projects from the seal wall 110 to the front side in the vehicle traveling direction inside the through hole 71 of the seal member 70. That is, the front side in the vehicle traveling direction of the annular projection 132 is disposed inside the through hole 71 of the seal member 70. The annular projection 132 is formed in an annular shape that surrounds the opening 112. More specifically, the annular projection 132 is formed in an annular shape so as to surround the tube connector 80 and supports the tube connector 80.

The annular projection 132 is in contact with an inner peripheral face 71a which forms the through hole 71 of the seal member 70. The annular projection 132 includes a fitting part 134 where the second case part 120b is fitted with the first case part 120a. The fitting part 134 includes a recess of the first case part 120a and a projection 134a of the second case part 120b, the projection 134a being fitted with the recess. The fitting part 134 is disposed on the front side in the vehicle traveling direction with respect to the fitting part 130.

In the present embodiment, it is assumed that water from the through hole 1a of the dash panel 1 enters only the right side in the vehicle width direction of the through hole 71 of the seal member 70. The fitting part 134 serves as a water passage Ya which guides water that enters through the right side in the vehicle width direction of the through hole 71 of the seal member 70 to a water passage 141. The water passage Ya is a clearance between the first case part 120a and the second case part 120b.

Figure 10:
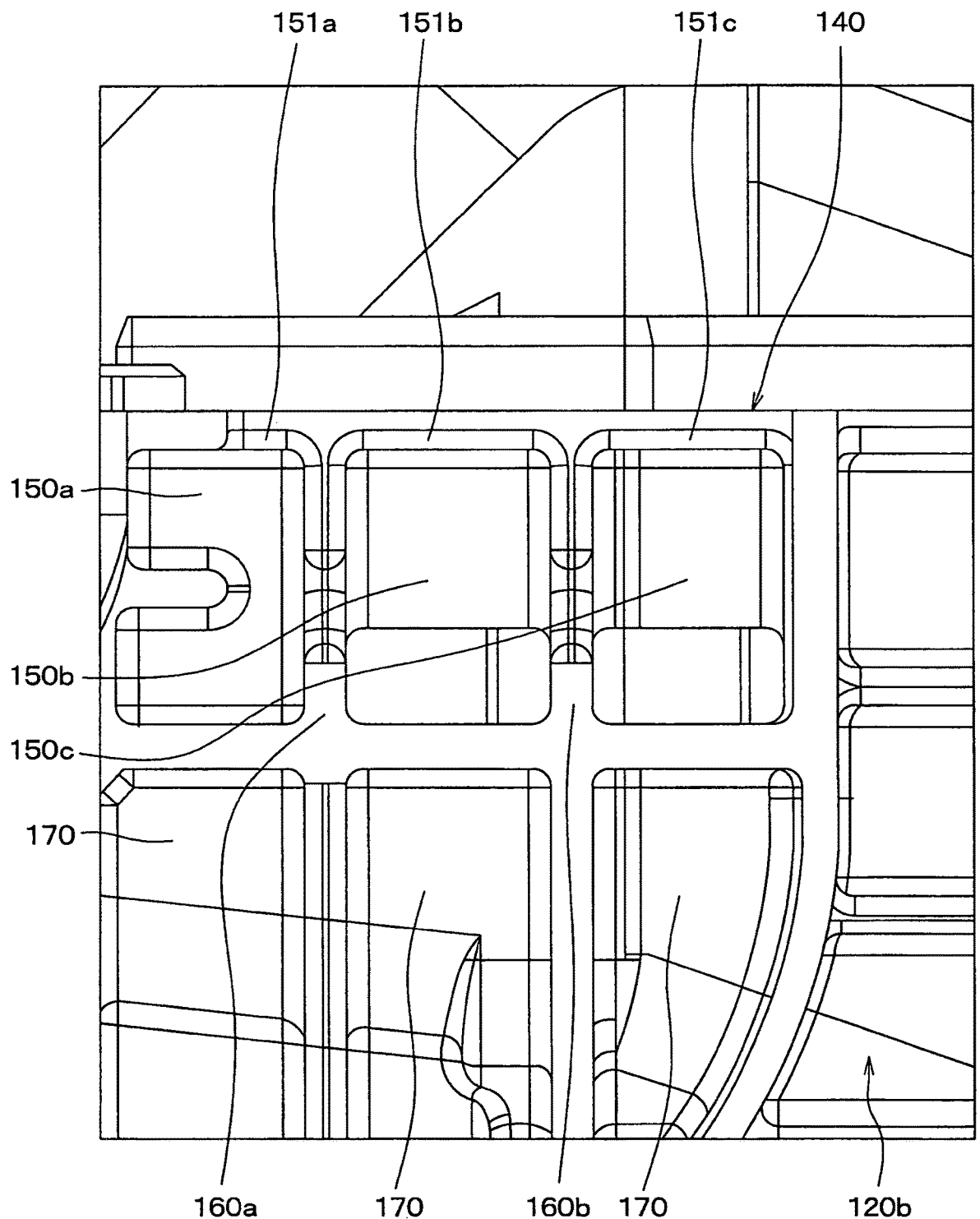
FIG. 10 is an enlarged view of the seal wall of the above embodiment illustrating hollows and water storage parts.

A canopy 140 which projects to the front side in the vehicle traveling direction is formed on the right side in the vehicle width direction of the seal wall 110. The canopy 140 is formed on the lower side in the vertical direction with respect to the fitting parts 134, 130. As illustrated in FIGS. 8, 9, and 10, the seal wall 110 includes hollows 150a, 150b, 150c. The hollows 150a, 150b, 150c are arranged in the vehicle width direction on the lower side in the vertical direction with respect to the canopy 140. That is, the hollows 150*a*, 150*b*, 150*c* are covered with the canopy 140 from the upper side in the vertical direction. Each of the hollows 150*a*, 150*b*, 150*c* is open to the front side in the vehicle traveling direction (that is, the side facing the seal member 70) and recessed to the rear side in the vehicle traveling direction.

As illustrated in FIG. 9, the water passage 141 is formed on the upper side in the vertical direction of the canopy 140. The water passage 141 is formed in a plane shape extending in the vehicle width direction and guides water from the fitting part 134 to the hollows 150*a*, 150*b*, 150*c*.

As illustrated in FIG. 9, recesses 151*a*, 151*b*, 151*c* are formed on the canopy 140 at the side facing the seal member 70. Each of the recesses 151*a*, 151*b*, 151*c* is recessed to the side opposite to the seal member 70.

The recess 151*a* is disposed on the upper side in the vertical direction with respect to the hollow 150*a* and constitutes a water path that guides water from the water passage 141 to the hollow 150*a*. The recess 151*b* is disposed on the upper side in the vertical direction with respect to the hollow 150*b* and constitutes a water path that guides water from the water passage 141 to the hollow 150*b*. The recess 151*c* is disposed on the upper side in the vertical direction with respect to the hollow 150*c* and constitutes a water path that guides water from the water passage 141 to the hollow 150*c*.

Figure 11:
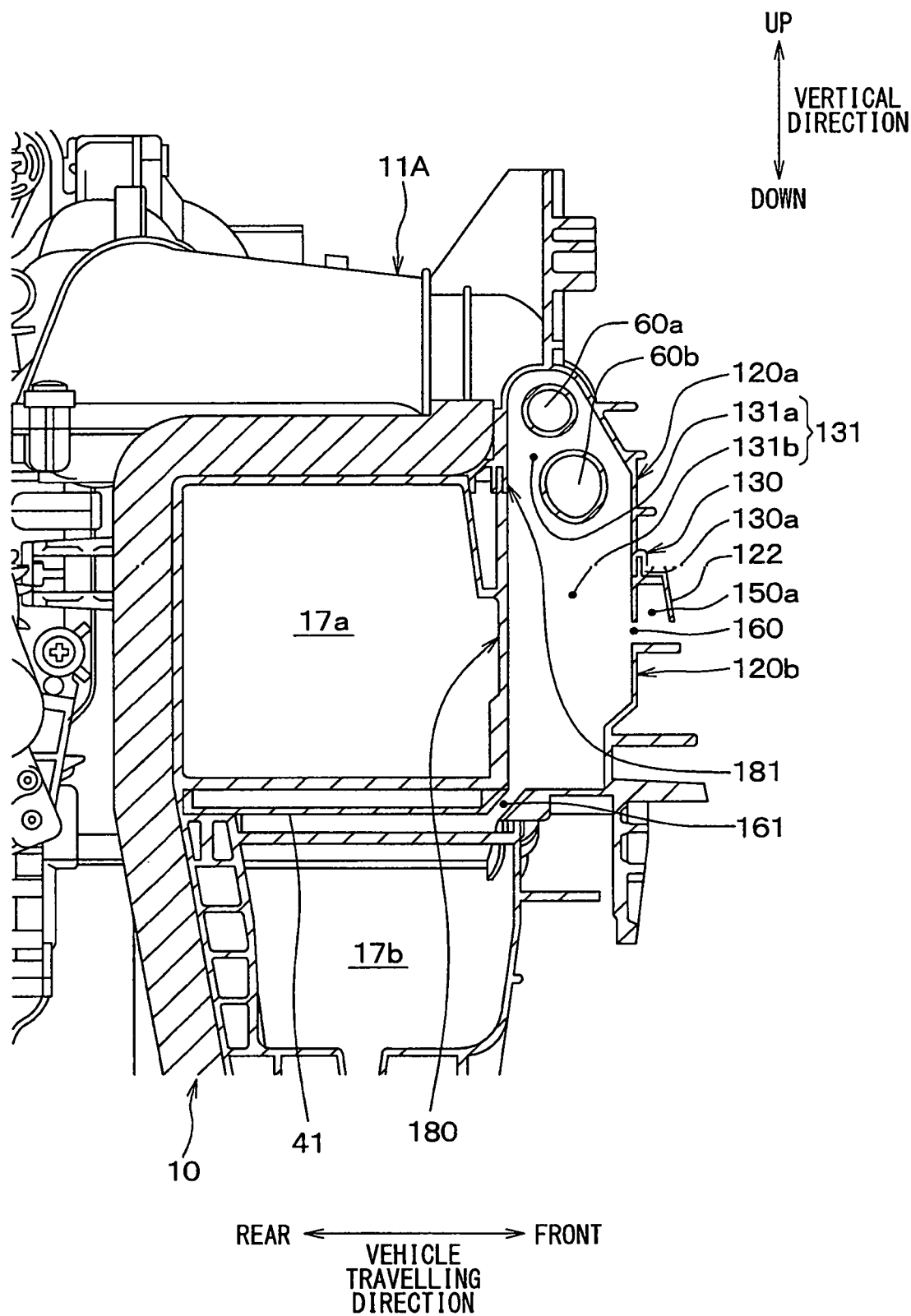
FIG. 11 is a sectional view illustrating an arrangement relationship between an air passage, a pipe storage part, and a communication passage of the above embodiment.

As illustrated in FIG. 11, the back side (that is, the rear side in the vehicle traveling direction) of the hollow 150*a* of the present embodiment communicates with the pipe storage part 131 through a communication hole 160. The communication hole 160 corresponds to a first communication hole. Accordingly, the communication hole 160 communicates with the outside of the air-conditioning case 11 through the hollow 150*a* on the lower side in the vertical direction with respect to the fitting parts 130, 134. The communication hole 160 is closed with the seal member 70 from the front side in the vehicle traveling direction.

The pipe storage part 131 communicates with the lower air passage 17*b* through a communication hole 161. The communication hole 161 corresponds to a second communication hole. The communication hole 161 is formed on the partition wall 41. Similarly, the back side of each of the hollows 150*b*, 150*c* communicates with the pipe storage part 131 through the communication hole 160.

The hollows 150*a*, 150*b* of FIGS. 9 and 10 are arranged side by side. A partition wall 160*a* is disposed between the hollows 150*a*, 150*b*. The partition wall 160*a* separates the hollows 150*a*, 150*b* from each other. A recess 161*a* as a cut-away part is formed on the partition wall 160*a* at the side facing the seal member 70 (that is, the front side in the vehicle traveling direction). The recess 161*a* is recessed to the side opposite to the seal member 70 (that is, the rear side in the vehicle traveling direction). The recess 161*a* allows water to move between the hollows 150*a*, 150*b*.

The hollows 150*b*, 150*c* are arranged side by side. A partition wall 160*b* is disposed between the hollows 150*b*, 150*c*. The partition wall 160*b* separates the hollows 150*b*, 150*c* from each other. A recess 161*b* as a cut-away part is formed on the partition wall 160*b* at the side facing the seal member 70 (that is, the front side in the vehicle traveling direction). The recess 161*b* is recessed to the side opposite to the seal member 70 (that is, the rear side in the vehicle traveling direction). The recess 161*b* allows water to move between the hollows 150*b*, 150*c*.

The seal wall 110 includes a plurality of water storage parts (that is, lightening parts) 170 which are arranged in matrix on the right side in the vehicle width direction of the seal wall 110 and on the lower side in the vertical direction with respect to the hollows 150*a*, 150*b*, 150*c*. Each of the water storage parts 170 is open to the front side in the vehicle traveling direction (that is, the side facing the seal member 70) and recessed to the rear side in the vehicle traveling direction. The seal wall 110 of the present embodiment includes no hollow and no water storage part, but includes a plane 111 on the left side in the vehicle width direction thereof.

The first case part 120*a* of the present embodiment is provided with a cover member 122. The cover member 122 is a plate-like member that extends to the lower side in the vertical direction in the first case part 120*a*. The cover member 122 covers the hollows 150*a*, 150*b*, 150*c* from the front side in the vehicle traveling direction. The cover member 122 of the present embodiment constitutes an adhesion surface that adheres to the seal member 70.

As illustrated in FIG. 11, the air-conditioning case 11 of the present embodiment includes a wall part 180 which is formed on the side opposite to the communication hole 160 with respect to the pipe storage part 131. The wall part 180 is disposed between the pipe storage part 131 and the air passage 17. The wall part 180 includes a fitting part 181 where the case parts 120*a*, 120*b* are fitted with each other.

Next, a drain operation of the vehicle air conditioner 5 of the present embodiment will be described.

First, high-pressure water flowing from the engine room through the through hole 1*a* of the dash panel 1 and the through hole 71 of the seal member 70 passes through a space between the inner peripheral face 71*a* of the seal member 70 and the pressure reducing valve 52 and then flows along the fitting part 134 (that is, the water passage Ya). Then, the water from the fitting part 134 flows through the water passage 141 of the canopy 140 as indicated by arrow G and then flows into the hollows 150*a*, 150*b*, 150*c* through the recesses 151*a*, 151*b*, 151*c*. Then, the water from the hollows 150*a*, 150*b*, 150*c* flows to the communication hole 160, the pipe storage part 131, the communication hole 161, the lower air passage 17*b*, the drain hole 18, and the outside of the vehicle compartment in this order.

Even when a large amount of water from the water passage 141 flows to, for example, the hollow 150*a* among the hollows 150*a*, 150*b*, 150*c*, the water from the hollow 150*a* can be moved to the hollows 150*b*, 150*c* through the recesses 161*a*, 161*b*. Thus, it is possible to distribute the amount of water inside the hollows 150*a*, 150*b*, 150*c* to prevent the water from overflowing from the hollows 150*a*, 150*b*, 150*c*.

On the other hand, even when water from the hollows 150*a*, 150*b*, 150*c* overflows toward the seal member 70 (that is, the front side in the vehicle traveling direction), the water flows into some of the plurality of water storage parts 170 that are located on the lower side in the vertical direction of the hollows 150*a*, 150*b*, 150*c*.

Further, when water overflows from the water storage parts 170 that are located on the upper side in the vertical direction, the water flows into the water storage parts 170 that are located on the lower side in the vertical direction. Thus, the water overflowing from the water storage parts 170 that are located on the upper side in the vertical direction can be stored in the water storage parts 170 that are located on the lower side in the vertical direction.

In this manner, water overflowing from the hollows 150*a*, 150*b*, 150*c* can be stored in the water storage parts 170.

According to the present embodiment described above, the vehicle air conditioner 5 includes the air-conditioning case 11. The air-conditioning case 11 includes the case parts 120a, 120b which are fitted with each other to form the air passage 17 which causes an air flow to pass toward the seats in the vehicle compartment and the drain hole 18 which allows the air passage 17 and the outside of the vehicle compartment to communicate with each other. The vehicle air conditioner 5 includes the cooling heat exchanger 20 which is disposed inside the air passage 17 and performs heat exchange between an air flow and a refrigerant. The vehicle air conditioner 5 includes the seal member 70 which is held between the dash panel 1 which separates the engine room on the front side in the vehicle traveling direction and the inside of the vehicle compartment from each other and the seal wall 110 which is formed on the front side in the vehicle traveling direction of the air-conditioning case 11 to close the through hole 1a of the dash panel 1.

The refrigerant pipes 60a, 60b, 60c, 60d, 60e connect the cooling heat exchanger 20 and the compressor 50 inside the engine room to each other in a state in which the refrigerant pipes 60a, 60b, 60c, 60d, 60e pass through the through hole 112 of the seal wall 110, the through hole 71 of the seal member 70, and the through hole 1a of the dash panel 1. The refrigerant pipes 60a, 60b, 60c, 60d, 60e constitute the refrigeration cycle which circulates the refrigerant between the compressor 50 and the cooling heat exchanger 20.

The pressure reducing valve 52 is disposed inside the through hole 71 of the seal member 70 and disposed between the refrigerant discharge port of the compressor 50 and the refrigerant inlet of the cooling heat exchanger 20. The pressure reducing valve 52 reduces the pressure of the refrigerant that is discharged through the refrigerant discharge port of the compressor 50 and flows toward the refrigerant inlet of the cooling heat exchanger 20.

The communication hole 160 which allows the outside of the air-conditioning case 11 and the air passage 17 to communicate with each other is formed on the air-conditioning case 11 on the lower side in the vertical direction with respect to the fitting part 134 where the case parts 120a, 120b are fitted with each other.

The air-conditioning case 11 includes the annular projection 132 which projects from the seal wall 110 into the through hole 71 of the seal member 70, has an annular shape surrounding the opening 112 of the seal wall 110, and constitutes the fitting part 134.

Thus, water passing through the through hole 1a of the dash panel 1 and the through hole 71 of the seal member 70 from the engine room flows into the fitting part 134. Then, the water flows along the fitting part 134 and then passes through the water passage 141, the recesses 151a, 151b, 151c, the hollows 150a, 150b, 150c, the communication hole 160, the air passage 17, and the drain hole 18 in this order. Then, the water is discharged to the outside of the vehicle compartment.

Accordingly, it is possible to provide the vehicle air conditioner 5 which discharges water that enters the inside of the vehicle compartment from the engine room through the through hole 1a of the dash panel 1 to the outside of the vehicle compartment without forming a water passage space.

In the present embodiment, the seal member 70 closes the communication hole 160 from the front side in the vehicle traveling direction. Thus, it is possible to prevent an air flow from leaking to the outside of the air-conditioning case 11 from the air passage 17 through the communication hole 160.

In the present embodiment, the partition wall 160a forms the recess 161a which allows water to move between the hollows 150a, 150b. The partition wall 160b forms the recess 161b which allows water to move between the hollows 150b, 150c. Thus, even when a large amount of water from the water passage 141 flows to any of the hollows 150a, 150b, 150c, the large amount of water can be distributed to the hollows 150a, 150b, 150c through the recesses 161a, 161b. Thus, it is possible to prevent water from overflowing from the hollows 150a, 150b, 150c.

In the present embodiment, a part of the canopy 140 located at the side facing the seal member 70 is recessed to the side opposite to the seal member 70 to form the recesses 151a, 151b, 151c which form the water paths for guiding water from the water passage 141 to the hollows 150a, 150b, 150c. Thus, it is possible to guide water from the water passage 141 to the hollows 150a, 150b, 150c in a favorable manner.

In the present embodiment, the seal wall 110 forms the plurality of water storage parts 170 which store water overflowing from the hollows 150a, 150b, 150c. Accordingly, it is possible to prevent the inside of the vehicle compartment from getting wet with water from the water passage 141.

In the present embodiment, the water storage parts 170 are arrayed in matrix in the seal wall 110. Thus, water overflowing from the water storage parts 170 located on the upper side in the vertical direction can be stored in the water storage parts 170 located on the lower side in the vertical direction. Thus; it is possible to more reliably prevent the inside of the vehicle compartment from getting wet with water overflowing from the hollows 150a, 150b, 150c.

In the present embodiment, the air-conditioning case 11 includes the wall part 180 which is disposed at the side opposite to the communication hole 160 with respect to the pipe storage part 131 and constituted of the case parts 120a, 120b fitted with each other.

Accordingly, even when a large amount of water flows to the pipe storage part 131 from the hollows 150a, 150b, 150c through the communication hole 160, it is possible to prevent the water from leaking into the vehicle compartment from the pipe storage part 131.

Other Embodiments (1) The above embodiment describes an example in which the heat exchanger is the cooling heat exchanger 20. Alternatively, the heat exchanger may be a heating heat exchanger.

(2) The above embodiment describes an example in which the outside of the air-conditioning case 11 and the pipe storage part 131 communicate with each other through the communication hole 160. Alternatively, the outside of the air-conditioning case 11 and the lower air passage 17b may communicate with each other through the communication hole 160.

(3) The above embodiment describes an example in which the hollows 150a, 150b, 150c are arranged in the vehicle width direction. Alternatively, the hollows 150a, 150b, 150c may be arranged in the vertical direction.

(4) The above embodiment describes an example in which the hollows 150a, 150b, 150c and the water storage parts 170 are disposed on the right side in the vehicle width direction of the seal wall 110. Alternatively, the hollows 150a, 150b, 150c and the water storage parts 170 may be disposed on the left side in the vehicle width direction of the seal wall 110.

Alternatively, the hollows 150a, 150b, 150c and the water storage parts 170 may be disposed on the left side in the vehicle width direction and the right side in the vehicle width direction of the seal wall 110.

(5) The above embodiment describes an example in which the plurality of hollows 150a, 150b, 150c are disposed on the seal wall 110. Alternatively, only one hollow may be disposed on the seal wall 110.

(6) The above embodiment describes an example in which the plurality of water storage parts 170 are disposed on the seal wall 110. Alternatively, only one water storage part 170 may be disposed on the seal wall 110.

(7) The above embodiment describes an example in which the first case part 120a includes the recess, and the second case part 120b includes the projection. Alternatively, the second case part 120b may include a recess, and the first case part 120a may include a projection.

(8) The above embodiment describes an example in which the seal support part 100 includes the two case parts 120a, 120b. Alternatively, the seal support part 100 may include three or more case parts.

(9) The above embodiment describes an example in which the fitting part 134 which serves as the water passage Ya which guides water that enters through the right side in the vehicle width direction of the through hole 71 of the seal member 70 to the water passage 141 is disposed inside the through hole 71 of the seal member 70. Alternatively, the following configuration may be employed.

Specifically, the fitting part 134 may be disposed at a position where the fitting part 134 and the opening of the through hole 71 of the seal member 70 overlap each other when viewed in the vehicle traveling direction outside the through hole 71 of the seal member 70.

(10) The present disclosure is not limited to the embodiments described above and can be modified in an appropriate manner. The embodiment and the other embodiments are not unrelated to each other and can be combined with each other in an appropriate manner unless the combination is clearly impossible. In each of the embodiment and the other embodiments, it is needless to say that the elements constituting the embodiment are not necessarily indispensable unless the elements are specifically stated as indispensable or the elements are regarded as obviously indispensable in principle.

Overview

According to a first aspect described in some or all of the embodiment and the other embodiments, a vehicle air conditioner mounted on a vehicle includes: an air-conditioning case disposed inside a vehicle compartment and including a first case part and a second case part that are fitted with each other, the air-conditioning case defining an air passage configured to allow an air flow to pass therethrough toward a seat in the vehicle compartment, and a drain hole through which the air passage communicates with an outside of the vehicle compartment; a heat exchanger disposed inside the air passage and configured to perform heat exchange between the air flow and refrigerant; a seal member held between a dash panel and a seal wall, the dash panel separating the vehicle compartment and an engine room that is located frontward of the vehicle compartment in the vehicle in a vehicle traveling direction, the seal wall being a wall of the air-conditioning case on a front side of the air-conditioning case in the vehicle traveling direction, the seal member having a through hole and disposed to close a through hole of the dash panel; a refrigerant pipe connecting the heat exchanger to a compressor inside the engine room in a state where the refrigerant pipe extends through an opening provided on the seal wall, the through hole of the seal member and the through hole of the dash panel, the refrigerant pipe constituting a refrigeration cycle that circulates the refrigerant between the heat exchanger and the compressor; and a pressure reducing valve disposed inside the through hole of the seal member and disposed between a refrigerant discharge port of the compressor and a refrigerant inlet of the heat exchanger, the pressure reducing valve being configured to reduce a pressure of the refrigerant that is discharged from the refrigerant discharge port of the compressor and flows toward the refrigerant inlet of the heat exchanger. The first case part and the second case part are fitted with each other in a fitting part below which, in a vertical direction, the air-conditioning case has a communication hole through which an outside of the air-conditioning case communicates with the air passage. The air-conditioning case is configured to allow water, which has passed through the through hole of the dash panel and the through hole of the seal member from the engine room, to flow along the fitting part and pass through the communication hole, the air passage and the drain hole, and then to be discharged to the outside of the vehicle compartment. The fitting part is a clearance formed between the projection and the recess between the first case part and the second case part.

According to a second aspect, the seal member closes a front side of the communication hole in the vehicle traveling direction. Accordingly, it is possible to prevent an air flow from the air passage from leaking to the outside of the air-conditioning case.

According to a third aspect, the air-conditioning case includes an annular projection projecting from the seal wall into the through hole of the seal member and having an annular shape surrounding the opening of the seal wall, and the annular projection constitutes the fitting part.

Accordingly, it is possible to easily guide water, which has passed through the through hole of the dash panel and the through hole of the seal member from the engine room, to the fitting part.

According to a fourth aspect, the seal wall includes a water passage through which water flows after passing through the fitting part, and a hollow open frontward in the vehicle traveling direction and configured to introduce water therein from the water passage. The hollow communicates with the air passage through the communication hole. The seal wall is configured to allow water from the hollow to flow to the air passage through the communication hole. The hollow is formed on the seal wall in a recessed manner.

According to a fifth aspect, the hollow of the seal wall is one of a plurality of hollows including two hollows disposed side by side, and the seal wall includes a partition wall separating the two hollows from each other. The partition wall defines a passage configured to allow water to move between the two hollows.

According to a sixth aspect, the seal wall includes a canopy that covers an upper side of the hollow in the vertical direction. The upper side of the canopy in the vertical direction constitutes the water passage.

According to a seventh aspect, the canopy includes a recess recessed rearward from a front side of the canopy in the vehicle traveling direction, and the recess defines a water path that guides water from the water passage to the hollow.

Accordingly, it is possible to guide water from the water passage to the hollow in a favorable manner.

According to an eighth aspect, the seal wall includes a water storage part open frontward in the vehicle traveling direction and configured to store water overflowed from the hollow.

Accordingly, it is possible to prevent the inside of the vehicle compartment from getting wet with water overflowed from the hollow in advance. The water storage part is formed on the seal wall in a recessed manner.

According to a ninth aspect, the water storage part of the seal wall is one of a plurality of water storage parts. Accordingly, it is possible to more reliably prevent the inside of the vehicle compartment from getting wet with water overflowed from the hollow.

According to a tenth aspect, the air-conditioning case includes a pipe storage part communicating with the opening of the seal wall and housing the refrigerant pipe, a first communication hole as the communication hole for guiding water from the hollow into the pipe storage part, and a second communication hole through which the pipe storage part communicates with the air passage for guiding water from the pipe storage part to the air passage.

According to an eleventh aspect, the air-conditioning case includes a wall part facing the first communication hole across the pipe storage part and having a configuration where the first case part and the second case part are fitted with each other.

Accordingly, it is possible to prevent the inside of the vehicle compartment from getting wet with water flowing to the pipe storage part through the first communication hole.

According to a twelfth aspect, the first case part is disposed upward of the second case part in the vertical direction.

What is claimed is:

1. A vehicle air conditioner mounted on a vehicle, the vehicle air conditioner comprising:
   an air-conditioning case disposed inside a vehicle compartment and including a first case part and a second case part that are fitted with each other, the air-conditioning case defining an air passage configured to allow an air flow to pass therethrough toward a seat in the vehicle compartment, and a drain hole through which the air passage communicates with an outside of the vehicle compartment;
   a heat exchanger disposed inside the air passage and configured to perform heat exchange between the air flow and refrigerant;
   a seal member held between a dash panel and a seal wall, the dash panel separating the vehicle compartment and an engine room that is located frontward of the vehicle compartment in the vehicle in a vehicle traveling direction, the seal wall being a wall of the air-conditioning case on a front side of the air-conditioning case in the vehicle traveling direction, the seal member having a through hole and disposed to close a through hole of the dash panel;
   a refrigerant pipe connecting the heat exchanger to a compressor inside the engine room in a state where the refrigerant pipe extends through an opening provided on the seal wall, the through hole of the seal member and the through hole of the dash panel, the refrigerant pipe constituting a refrigeration cycle that circulates the refrigerant between the heat exchanger and the compressor; and
   a pressure reducing valve disposed inside the through hole of the seal member and disposed between a refrigerant discharge port of the compressor and a refrigerant inlet of the heat exchanger, the pressure reducing valve being configured to reduce a pressure of the refrigerant that is discharged from the refrigerant discharge port of the compressor and flows toward the refrigerant inlet of the heat exchanger, wherein:
   the first case part and the second case part are fitted with each other in a fitting part below which, in a vertical direction, the air-conditioning case has a communication hole through which an outside of the air-conditioning case communicates with the air passage; and
   the air-conditioning case is configured to allow water, which has passed through the through hole of the dash panel and the through hole of the seal member from the engine room, to flow along the fitting part and pass through the communication hole, the air passage and the drain hole, and then to be discharged to the outside of the vehicle compartment.

2. The vehicle air conditioner according to claim 1, wherein the seal member closes a front side of the communication hole in the vehicle traveling direction.

3. The vehicle air conditioner according to claim 1, wherein the air-conditioning case includes an annular projection projecting from the seal wall into the through hole of the seal member and having an annular shape surrounding the opening of the seal wall, and the annular projection constitutes the fitting part.

4. The vehicle air conditioner according to claim 3, wherein:
   the seal wall includes:
      a water passage through which water flows after passing through the fitting part; and
      a hollow open frontward in the vehicle traveling direction and configured to introduce water therein from the water passage;
   the hollow communicates with the air passage through the communication hole; and
   the seal wall is configured to allow water from the hollow to flow to the air passage through the communication hole.

5. The vehicle air conditioner according to claim 4, wherein:
   the hollow of the seal wall is one of a plurality of hollows including two hollows disposed side by side, and the seal wall includes a partition wall separating the two hollows from each other; and
   the partition wall defines a passage configured to allow water to move between the two hollows.

6. The vehicle air conditioner according to claim 4, wherein:
   the seal wall includes a canopy that covers an upper side of the hollow in the vertical direction; and
   an upper side of the canopy in the vertical direction constitutes the water passage.

7. The vehicle air conditioner according to claim 6, wherein the canopy includes a recess recessed rearward from a front side of the canopy in the vehicle traveling direction, and the recess defines a water path that guides water from the water passage to the hollow.

8. The vehicle air conditioner according to claim 4, wherein the seal wall includes a water storage part open frontward in the vehicle traveling direction and configured to store water overflowed from the hollow.

9. The vehicle air conditioner according to claim 8, wherein the water storage part of the seal wall is one of a plurality of water storage parts.

10. The vehicle air conditioner according to claim 4, wherein:
    the air-conditioning case includes:
       a pipe storage part communicating with the opening of the seal wall and housing the refrigerant pipe;
       a first communication hole as the communication hole for guiding water from the hollow into the pipe storage part; and a second communication hole through which the pipe storage part communicates with the air passage for guiding water from the pipe storage part to the air passage.

11. The vehicle air conditioner according to claim 10, wherein the air-conditioning case includes a wall part facing the first communication hole across the pipe storage part and having a configuration where the first case part and the second case part are fitted with each other.

12. The vehicle air conditioner according to claim 1, wherein the first case part is disposed upward of the second case part in the vertical direction.

* * * * *